Figure 1:
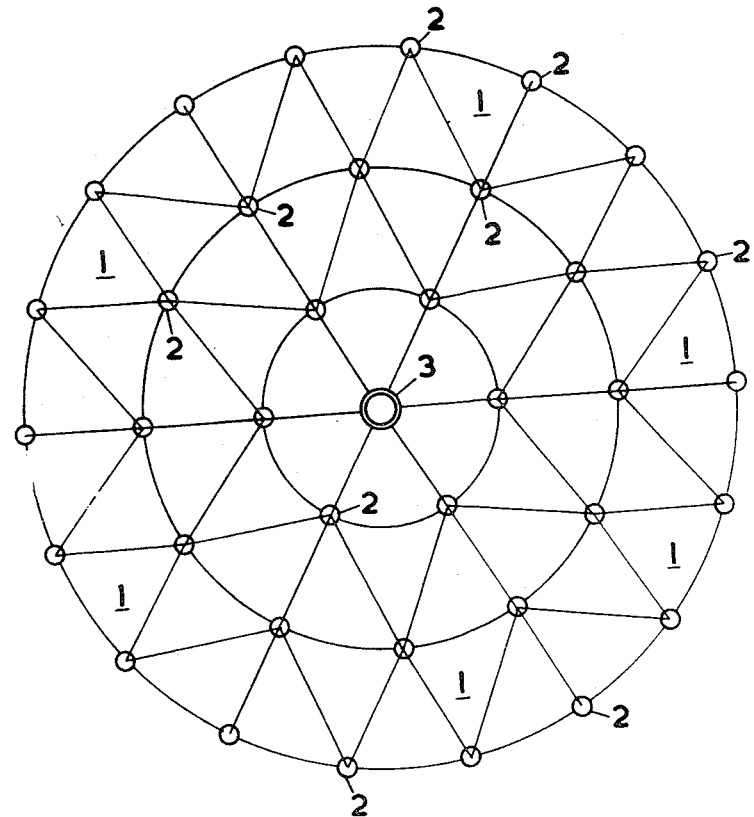

July 12, 1966     D. W. BURR     3,261,016

NON-RIGID SERVO-CONTROLLED AERIAL STRUCTURES

Filed March 4, 1963     6 Sheets-Sheet 1

DONALD WILLIAM BURR

*Inventor*

By *Moore, Hall & Pollock*

Attorney

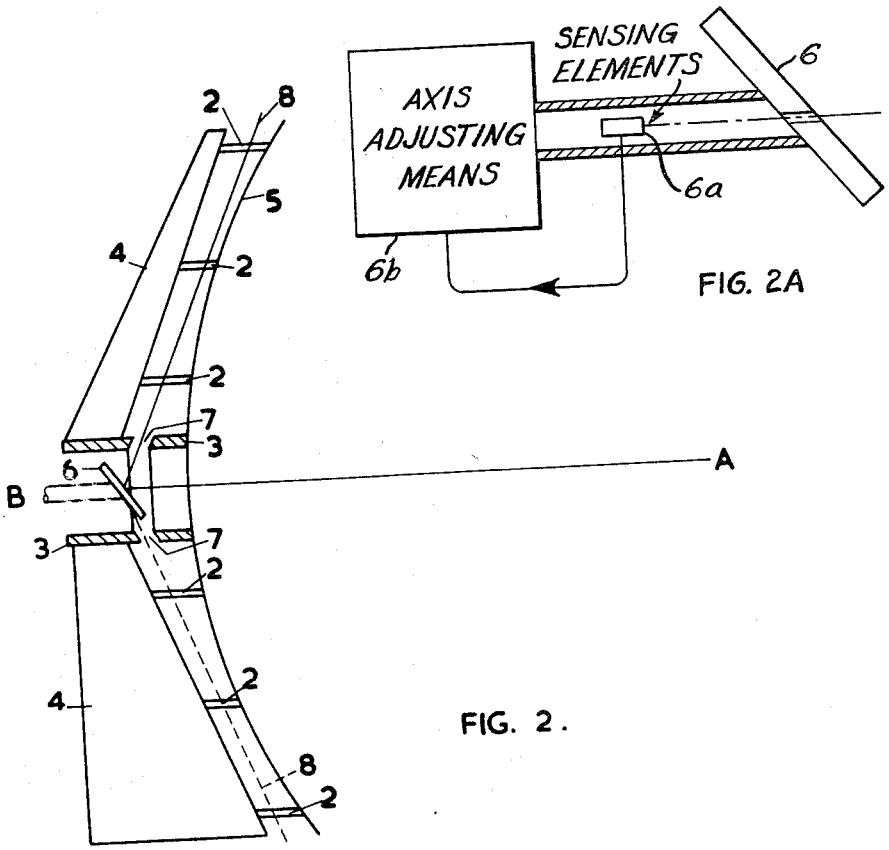
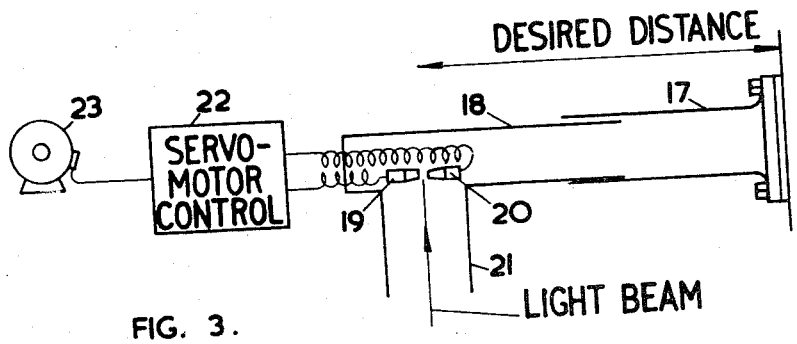

July 12, 1966  D. W. BURR  3,261,016
NON-RIGID SERVO-CONTROLLED AERIAL STRUCTURES
Filed March 4, 1963  6 Sheets-Sheet 5

DONALD WILLIAM BURR

*Inventor*
By Moore, Hall + Pollock
*Attorney*

July 12, 1966  D. W. BURR  3,261,016
NON-RIGID SERVO-CONTROLLED AERIAL STRUCTURES
Filed March 4, 1963  6 Sheets-Sheet 6

DONALD WILLIAM BURR
*Inventor*
By Moore, Hall & Pollock
*Attorney*

United States Patent Office 3,261,016
Patented July 12, 1966

3,261,016
NON-RIGID SERVO-CONTROLLED AERIAL STRUCTURES
Donald William Burr, Camargue, Welland, near Malvern, England, assignor to Minister of Aviation, in Her Majesty's Government of the United Kingdom of Great Britain and Northern Ireland, London, England
Filed Mar. 4, 1963, Ser. No. 263,093
Claims priority, application Great Britain, Mar. 8, 1962, 8,926/62
9 Claims. (Cl. 343—100)

This invention relates to aerial structures and has reference to aerial structures of the steerable kind.

Aerials of the steerable kind are assuming considerable importance in present times owing to their use for so-called tracking radars, radio telescopes, artificial satellite radio systems and so forth; frequencies of the order of 10,000 mc./s. are often employed.

Steerable aerials often employ large reflectors or "dishes" as they are sometimes called, and small radiating and/or receiving sources are placed at suitable focal points of the reflector. Parabolic reflectors are in general use but reflectors having other profiles are possible and find application. At high frequencies, it will be appreciated, rigidity of the profile is of great importance in the face of wind combined with the force of gravity. Moreover steering control is required to be accurate, hence rigidity of the supporting structure and driving machinery of an aerial must be ensured.

A practical limit to the rigidity of an aerial structure is reached when the size of an aerial is increased beyond a limit which depends upon the frequency. Some extension beyond this limit may be achieved by the adoption of unconventional methods of structural design and by the use of exotic materials; and cost then more quickly determines the limit. For example a steerable aerial 80 feet in diameter for operation at 10,000 mc./s. could prove to be prohibitively expensive.

According to the invention, therefore, an aerial structure comprises a non-rigid aerial reflector having an adjustable profile, adjusting means for adjusting the reflector profile, measuring means for measuring deviations of the profile from a desired standard at a number of points of the profile, and control paths for completing servo control loops between the measuring means and profile adjusting means whereby the profile is adjusted into a predetermined relationship to the standard surface.

Figure 4:
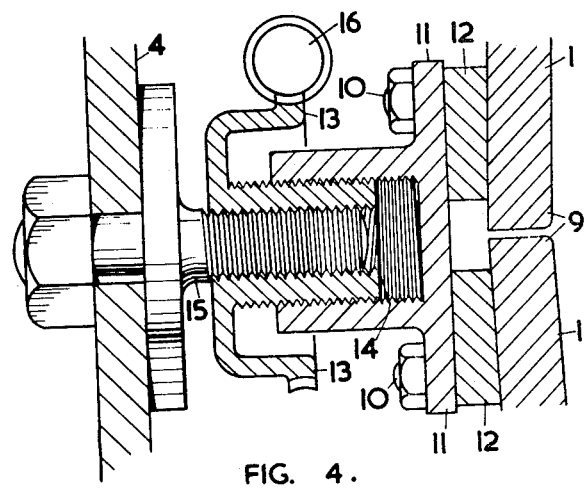
Figure 5:
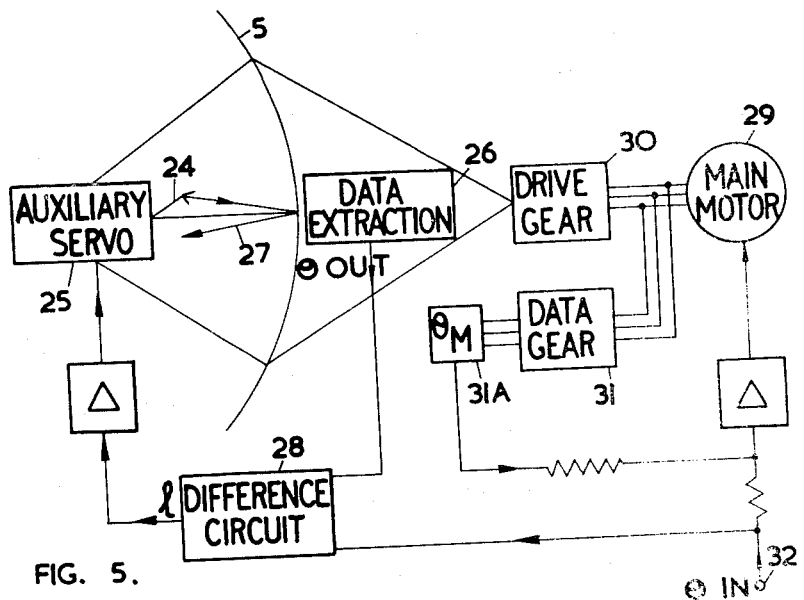
Figure 6:
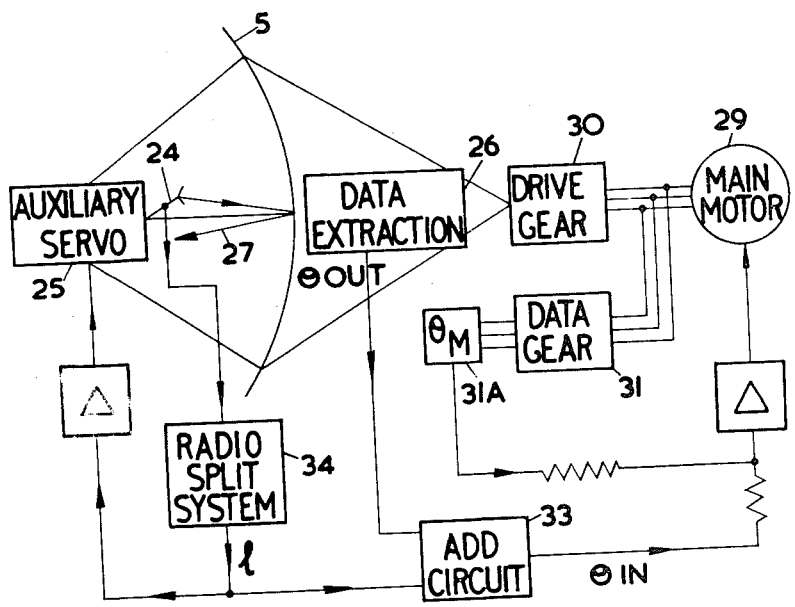

In order to make the invention clearer an example of an aerial structure according to the invention will be described together with examples of aerial arrangements for different radar tracking systems. Reference will be made to the drawings accompanying this specification in which:

FIG. 1 shows diagrammatically a rear view of a non-rigid aerial reflector;
FIG. 2 shows diagrammatically an elevational view of an optical arrangement for measuring deviations of the aerial reflector profile;
FIG. 2a shows diagrammatically a detail of FIGURE 2.
FIG. 3 shows diagrammatically a part detail of the optical arrangement;
FIG. 4 shows a servo-motor driven differential jack for adjusting deviations of the reflector profile;
FIG. 5 shows diagrammatically an arrangement in which a non-rigid aerial is used in command tracking radar;
FIG. 6 shows diagrammatically an arrangement in which a non-rigid aerial is used in an auto-tracking radar;
FIGS. 7, 8, 9 and 10 show diagrammatically an optical arrangement for determining azimuth and elevation of the radio beam reflected by a non-rigid aerial arrangement according to the invention.

In FIG. 1 a paraboloidal reflector for a steerable aerial structure is made up of three-sided panels 1 of glass fibre suitably metalised on their reflecting surfaces; alternatively aluminium honeycomb sandwich may be used. Each panel 1 is contoured so that it forms part of the desired profile of the aerial structure. Adjustment jacks 2, conveniently indicated only diagrammatically in this figure, support the panels 1 at their meeting points and are themselves mounted on the steerable frame (not visible in this figure) which supports the aerial structure. A hollow tube 3 is located at the center of the paraboloidal reflector, and the apices of the six triangular panels 1 around it are secured to it. The member 3 is itself secured directly to the steerable frame without intervening jacks.

FIG. 2 shows in diagram form the jacks 2 mounted on a steerable frame, the major supporting members 4 of which are shown. A line 5 indicates the required profile of the front surfaces of the panels 1. The central tube 3 is shown mounted on the frame members 4 and, for clarity, is shown somewhat out of proportion, to a large scale.

A rotatable plane mirror 6 is set at an angle to its axis of rotation AB, which is the same as the axis of the tube 3. A circumferential window 7 permits light from a source at A to be reflected along the walls 8 of a cone of revolution described by the rotation of the mirror 6.

The detailed arrangement of an adjustment jack 2 is shown in FIG. 4. The apices 9 of adjoining reflector panels 1 are secured by bolts 10 to a movable member 11, flexible spacing pieces 12 being inserted between them. The member 11 is threaded internally and co-operates with a gear wheel 13 which is correspondingly threaded on the outside of its bush 14. A practical thread size would be one giving say 10 threads per inch.

A further threaded member 15 is secured to the frame supporting member 4 and co-operates with an internal thread in the bush 14. A practical thread size would be one giving say 9 threads per inch. A worm 16 meshes with the gear wheel 13 and is coupled by means of a flexible drive to a servo motor (not shown in this figure).

Associated with each jack 2 is an optical head; this is illustrated in FIG. 3 where the head is supported simply by the two tubes 17, 18 one of which is regarded as secured to the back of a group of reflector panels 1 at a point where their apices meet. The "desired distance" may be adjusted by sliding the tube 18 into the tube 17.

The tube 18 carries two light sensitive sensing units 19, 20 and a sighting tube 21 passes light from the rotating beam from the mirror 6 (FIG. 2) onto the sensing units 19, 20. The sighting tube 21, although shown perpendicular to the tube 18 is, in practice, set for each jack at whatever angle is required to match that of the reflected light beam at any jack 2; in fact in general the tube 21 is set so that there is an unobstructed path to it for the rotating light beam from the mirror 6.

The sensing units 19, 20 are each connected to a different input of a servo motor control circuit 22 which controls a servo motor 23, the motor which is coupled to the drive worm 16 (FIG. 4) of the appropriate jack 2.

In operation, a light source is placed at A (FIG. 2) on the axis AB of revolution of the desired paraboloid profile of the aerial structure, and the mirror 6 in rotating (driven by any convenient motor) describes a conical surface whose accuracy is to a large degree dependent only upon the accuracy of the axis AB. The sensing elements 19, 20 associated with each adjusting jack 2 control the respective jack servo-motors 23 so that each sensing element receives equal light intensities from the rotating beam. In this condition the profile 5 is in the desired form, in the present example a paraboloid, and is maintained so, in spite of changes in itself and in the supporting members 4, by the servo action of the jacks 2. It will be appreciated that the profile 5 is maintained relative to the axis AB which can be established and positioned accurately without consideration of rigidity in the remainder of the structure i.e. the members 4, and the reflecting profile 5.

In some circumstances, for example where strains in the supporting members 4 are likely owing to sudden wind gusts or nuclear blast, the jacks 2 are preferably of the hydraulically-driven type to avoid the large electric motors which would otherwise be needed.

In order to maintain the axis of the mirror 6 accurately along the line AB, a further optical split system is arranged, as shown in FIGURE 2a, to allow some light from the source at A to pass through the mirror 6 and fall onto a cross-pattern of sensing elements 6a within the center tube 3. The output of these elements is then applied to axis adjusting means 6b which move the axis of the mirror 6 into coincidence with the line AB.

It is necessary, when so-called command tracking of a large aerial is required, to consider the behaviour of the structure when accelerations greater than the natural resonant frequency are imposed. Apart from danger due to mechanical oscillation, severe errors occur owing to yield of the structural components under the action of the accelerating forces. Such errors cannot be removed by control of the main aerial drive.

FIG. 5 shows the diagrammatical arrangement of a command tracking system in which the effect of these errors is reduced. A servo-controlled reflector structure is indicated by its controlled profile 5 and a radiation source 24 controlled by an auxiliary servo 25 feeds the reflector.

A data extraction circuit 26 determines the true position of the radiation beam 27 produced when the source 24 illuminates the reflector profile 5, and feeds its output to a difference circuit 28.

A main motor 29, in association with a conventional servo drive gear 30 and data gear 31, 31A, controls the direction of pointing of the aerial structure represented by the profile 5. The desired (i.e. command) direction $\theta_{IN}$ is put into the system at an input terminal 32 to the circuit of the main motor 29. The input terminal 32 also feeds into the difference circuit 28.

In operation, the circuit of the main motor 29 receives only command ($\theta_{IN}$) pointing information and the difference circuit computes the difference, $e$, between the commanded position $\theta_{IN}$ (i.e. the desired direction of pointing) and the true beam position $\theta_{OUT}$ obtained from data extraction circuit 26. This difference $e$ is applied to the auxiliary servo 25 which moves the radiation source 24 until the difference $e$ is eliminated i.e. until the beam 27 points in the direction of the target. Thus the input $\theta_{IN}$, not containing any component fed back from the aerial control system, does not cause any structural resonances to be excited, and the auxiliary servo 25 ensures that the radiation beam 27 points accurately at the target.

FIG. 6 shows diagrammatically an automatic tracking system, and designations are used similar to those of FIG. 5. Here, in automatic tracking, the input signal is obtained from the system itself giving a closed loop arrangement. A radio split system 34, if not otherwise provided, is incorporated in the system and is fed from the radiation source 24. An output is obtained representing the difference $e$ between $\theta_{IN}$, the target position and $\theta_{OUT}$, the true beam position and is applied to the auxiliary servo 25 to minimize tracking errors. It is also applied together with $\theta_{OUT}$, the true beam position output of the data extraction arrangement 26, to an add circuit 33 which makes the addition $\theta_{OUT}+e=\theta_{IN}$. This provides the input $\theta_{IN}$ for circuit of the main motor 29; and as long as $\theta_{OUT}$ is sufficiently free of error deriving from yield of the structure, it is safe to do this.

The data extraction circuit 26 is important and its accuracy determines to a large extent the success of the tracking system described, in employing non-rigid servo-controlled aerial structures.

Figure 7:
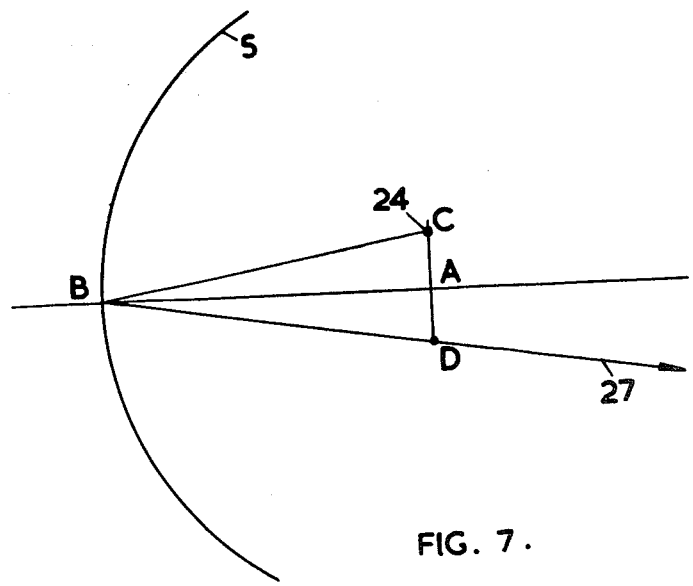

In FIG. 7, let the servo-controlled profile be taken as the line designated 5 and let the axis of symmetry of the controlled profile 5 be the line AB, the same line as referred to above in describing the method of generating a reference cone for the controlled paraboloid. The point C corresponds to the radiation source 24 and the reflected radiation beam 27 passes through the point D. The ratio of the angles CBA and ABD remains constant, the angles being substantially equal. The position of the point C is controlled by the auxiliary servo 25 and in FIG. 8 the broken lines 35 represent the limits of movement of the point C under control of the servo 25.

Figure 8:
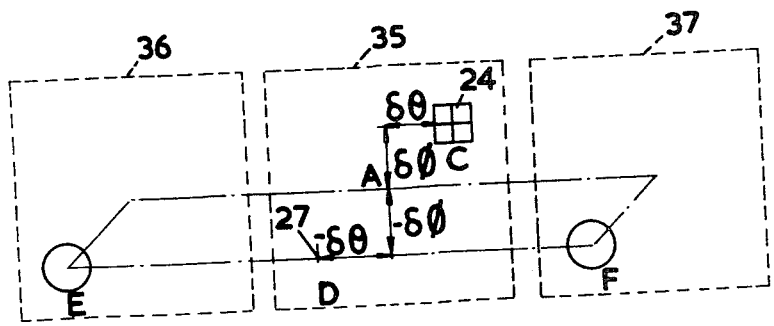

On a line EDF, which is set out so that it is perpendicular to the line CAD when that line is vertical in space (i.e. the aerial structure is in a position of rest unstrained and unstressed), two light sources E and F are set up. The arrangement is then made such that when the point C (the radiation source 24) is displaced, the point D and the sources E and F move into corresponding positions within their similar limits of movements 35, 36 and 37. A link mechanism is indicated, but any siutable mechanism may be employed to this end. The diagram of FIG. 8 is, in effect a view of the region of the feed 24 from the center B of the paraboloid.

Figure 9:
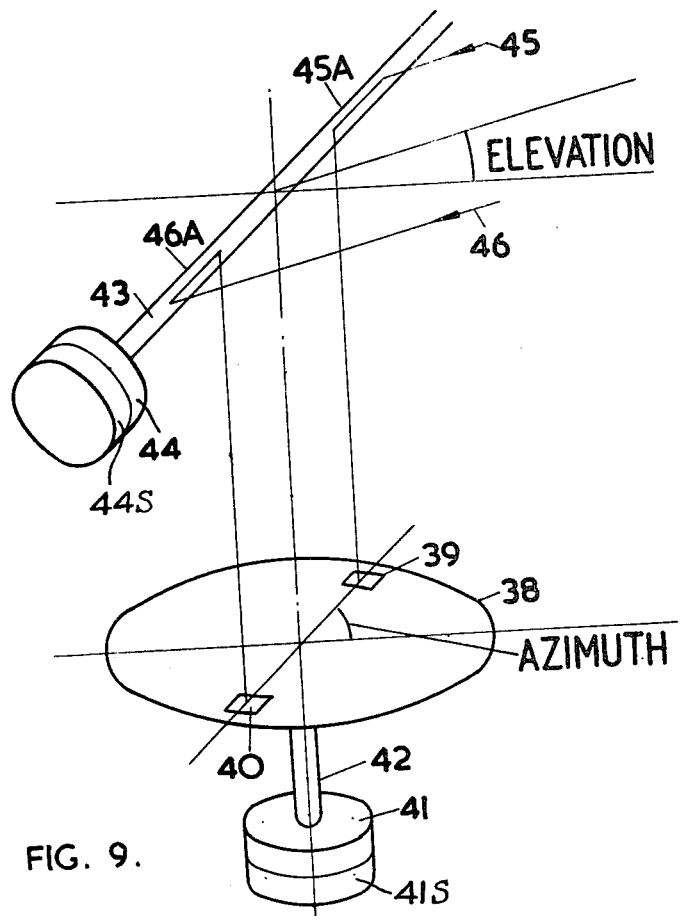
Figure 10:
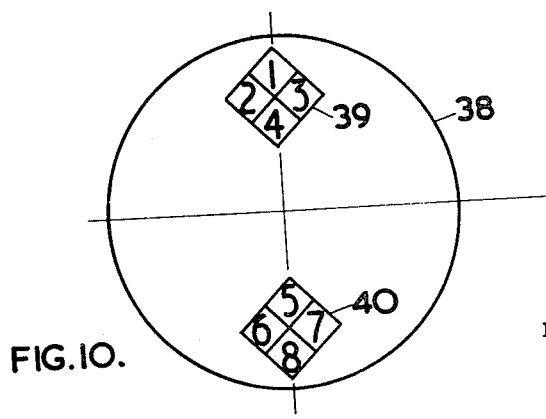

Next a platform 38 is positioned in an accurately horizontal plane (FIGS. 9 and 10). The platform 38 is conveniently a small rigid structure quite separate from the controlled aerial structure, or in some circumstances it may be a gyro-controlled table mounted on the aerial structure. In each case, platform 38 should be located in the region of the intersection of the main turning axes of the aerial.

The platform 38 is mounted so that it can rotate about a vertical axis, and it carries two groups of diametrically opposed light sensitive elements 39, 40, each consisting of a diamond cluster of four elements. An azimuth data extractor 41 is coupled to a shaft 42 mounted under the platform 38. The platform 38 is rotated by a precision servo 41S.

An elevation measuring shaft 43 is mounted parallel to and above the platform 38 (for clarity the conventional supports and journals are not shown) and carries an elevation data extratcor 44. The shaft 43 is also rotated by a precision servo 44S and carries lens and mirror systems 45A, 46A which direct downwards onto the platform 38 in the regions of the light-sensitive elements 39, 40 light beams incoming to the system along the directions 45, 46 and originating from the light sources E and F respectively near the radiation source (FIGS. 7 and 8).

The azimuth and elevation precision servos 41S and 44S which have been only diagrammatically illustrated in FIG. 9 for the sake of clarity and simplicity of presentation are controlled by the outputs of the light sensitive elements 39, 40.

In operation, the azimuth servo 41S is controlled by a combination of outputs of light sensitive elements:

$$(1+2+5+7)-(3+4+6+8)$$

and the elevation servo 44S is controlled by a combination of outputs:

$$(2+6)-(3+7)$$

The detailed arrangements of these servos 41S and 44S follow conventional lines and their carrying into effect is well within the capabilities of one skilled in the art.

Thus the data extraction circuit 26 is provided and gives the information $\theta_{OUT}$ (i.e. position of the radio beam) which is required for accurate servo control of a non-rigid tracker. The same information may of course be used for other purposes, as well, when required.

Although the arrangements described above are directed towards the construction of large non-rigid aerial structures, it is expected that significant advantages are to be obtained by applying the invention to smaller, more usual, structures.

Aerial structures used for small tracking radars for example, are designed to be very rigid to meet the following desiderata:

(a) to prevent distortion of the aerial profile;

(b) to remove mechanical resonance frequencies well out of the pass bands of the main control system of an aerial and, (c) to ensure that the actual position of the radiation beam is represented by the angular displacements of the bearing axles in azimuth and elevation.

As will now be appreciated, a rigid structure is so designed that the deflections of its component parts under all the applied forces are within acceptable limits for a given material. The critical characteristic of the material is the ratio:

Modulus of Elasticity/Weight/Unit Volume

A safe structure is primarily designed to avoid destruction or permanent deformation, and the critical characteristic of the material is the ratio:

Ultimate Stress/Weight/Unit Volume

The permissible deflections in the components of a small precision tracker are such that if it is rigid it will be more than adequately safe. As the size is increased, unless the deflection requirements are relaxed, the margin of safety also increases.

A large precision tracker of adequate rigidity would thus have an enormous factor of safety and would be correspondingly costly and massive.

To meet any one alone of the desiderata, $a$, $b$ and $c$ might not allow a very significant relaxation of the rigidity requirement. The simultaneous meeting of all three, however, permits a structure to be designed neglecting rigidity and meeting merely the requirements of safety i.e. ability to support its own weight and avoid damage from wind.

I claim:

1. An aerial structure comprising a non-rigid aerial reflector having an adjustable profile, adjusting means for adjusting the reflector profile at a number of points of the profile, optical means for setting up optical paths which define a standard surface, measuring means including optical devices for measuring deviations between said standard surface and said number of points of the profile, and control means responsive to said optical devices for completing servo control loops between said measuring means and said adjusting means for adjusting said number of points of said profile into predetermined positional relationships to said standard surface.

2. An aerial structure comprising a non-rigid aerial reflector having an adjustable profile, adjusting means for adjusting the reflector profile at a number of points of the profile, optical means for setting up optical paths which define a standard surface, measuring means including optical devices for measuring deviations between said standard surface and said number of points of the profile, and control means responsive to said optical devices for completing servo control loops between said measuring means and said adjusting means for adjusting said number of points of said profile into predetermined positional relationships to said standard surface, said optical means comprising rotating beam means for rotating a beam about a reference axis of the reflector profile and generating optically a reference surface which constitutes the standard from which said profile deviations are measured.

3. An aerial structure as claimed in claim 2, wherein the predetermined relationship of said number of points of said profile to said standard surface constitute a paraboloid of revolution to cone of revolution, said rotating beam means comprising a plane mirror set obliquely on the axis of the paraboloid about which it rotates and illuminated through an axial aperture in the paraboloid by a light source on the axis.

4. An aerial structure as claimed in claim 3, wherein said plane mirror is located in a tube coaxial with the axis of the paraboloid, said tube having a circumferential aperture through which light reflected from the plane mirror passes to the rotating beam.

5. An aerial structure as claimed in the claim 3, wherein said plane mirror also transmits light onto an optical detecting device for detecting misalignment between the axis of rotation of the mirror and the axis of the paraboloid, axis adjusting means for adjusting the axis of rotation of the mirror, and means providing a control path connecting said optical detecting device to said axis adjusting means.

6. An aerial structure comprising a non-rigid aerial reflector having an adjustable profile, adjusting means for adjusting the reflector profile at a number of points of the profile, optical means for setting up optical paths which define a standard surface, measuring means including optical devices for measuring deviations between said standard surface and said number of points of the profile, control means responsive to said optical devices for completing servo control loops between said measuring means and said adjusting means for adjusting said number of points of said profile into predetermined positional relationships to said standard surface, a servo-motor control system for driving said aerial structure in response to a positioning input signal, auxiliary servo means for controlling the position of the feed to said aerial structure, data extraction means for extracting data in the form of a signal giving the true position of the main aerial beam, and a difference circuit for feeding a signal to said auxiliary servo means representing the difference between said positioning input signal and the true position signal of the main aerial beam.

7. An aerial structure as claimed in claim 6, wherein said data extraction means comprises a reference platform for defining a horizontal reference plane rotating about a vertical axis, two light sources spaced transversely of the direction of feed of the main aerial system, colinear with a point on the reflected beam originating from the feed and moving with the point as the feed moves, elevation measuring means comprising an optical system for directing light from the two sources onto a pair of detectors on the reference plane, said pair of detectors being disposed respectively at opposite ends of a diameter through the vertical axis of the platform and being operative jointly to provide signals for servo control of the optical system, and azimuthal measuring means comprising a servo control system controlled by signals from said detectors for rotating the platform to maintain the light from the two sources on the detectors.

8. An aerial structure comprising a non-rigid aerial reflector having an adjustable profile, adjusting means for adjusting the reflector profile at a number of points of the profile, optical means for setting up optical paths which define a standard surface, measuring means including optical devices for measuring deviations between said standard surface and said number of points of the profile, control means responsive to said optical devices for completing servo control loops between said measuring means and said adjusting means for adjusting said number of points of said profile into predetermined positional relationships to said standard surface, said aerial structure forming part of an automatic tracking system and being driven by a servo-motor control system in response to a positioning input signal, auxiliary servo means for controlling the position of the feed to the main aerial structure, data extraction means for extracting data in the form of a signal giving the true position of the main aerial beam, a radio split system providing a signal representing the difference between the true beam direction and the direction of a target and operative to control the auxiliary servo means according to this signal, and an adding circuit for adding the signal from the split system and the signal from the data extraction system and operative to feed the resultant signal to said servo-motor control system as said positioning input signal.

9. An aerial structure as claimed in claim 8, wherein said data extraction means comprises a reference platform for defining a horizontal reference plane rotating about a vertical axis, light sources spaced transversely of the direction of feed of the main aerial system, colinear with a point on the reflected beam originating from the feed and moving with the point as the feed moves, elevation measuring means comprising an optical system for directing light from the sources onto detectors positioned on the reference plane at opposite ends of a diameter through the vertical axis of the platform, said detectors jointly providing signals for servo control of the optical system, and azimuthal measuring means comprising a servo control system controlled by signals from said detectors for rotating the platform to maintain light from said light sources on said detectors.

References Cited by the Examiner

UNITED STATES PATENTS 2,497,065 2/1950 Braddon _____ 343—880 X
3,153,789 10/1964 Ashton.

FOREIGN PATENTS 989,286 5/1951 France.

CHESTER L. JUSTUS, *Primary Examiner.*

MAYNARD R. WILBUR, KATHLEEN CLAFFY,
*Examiners.*

T. H. TUBBESING, H. C. WAMSLEY,
*Assistant Examiners.*